April 30, 1968   M. KUTS   3,380,588
GOLF BALL SIZER
Filed Aug. 31, 1965   3 Sheets-Sheet 1
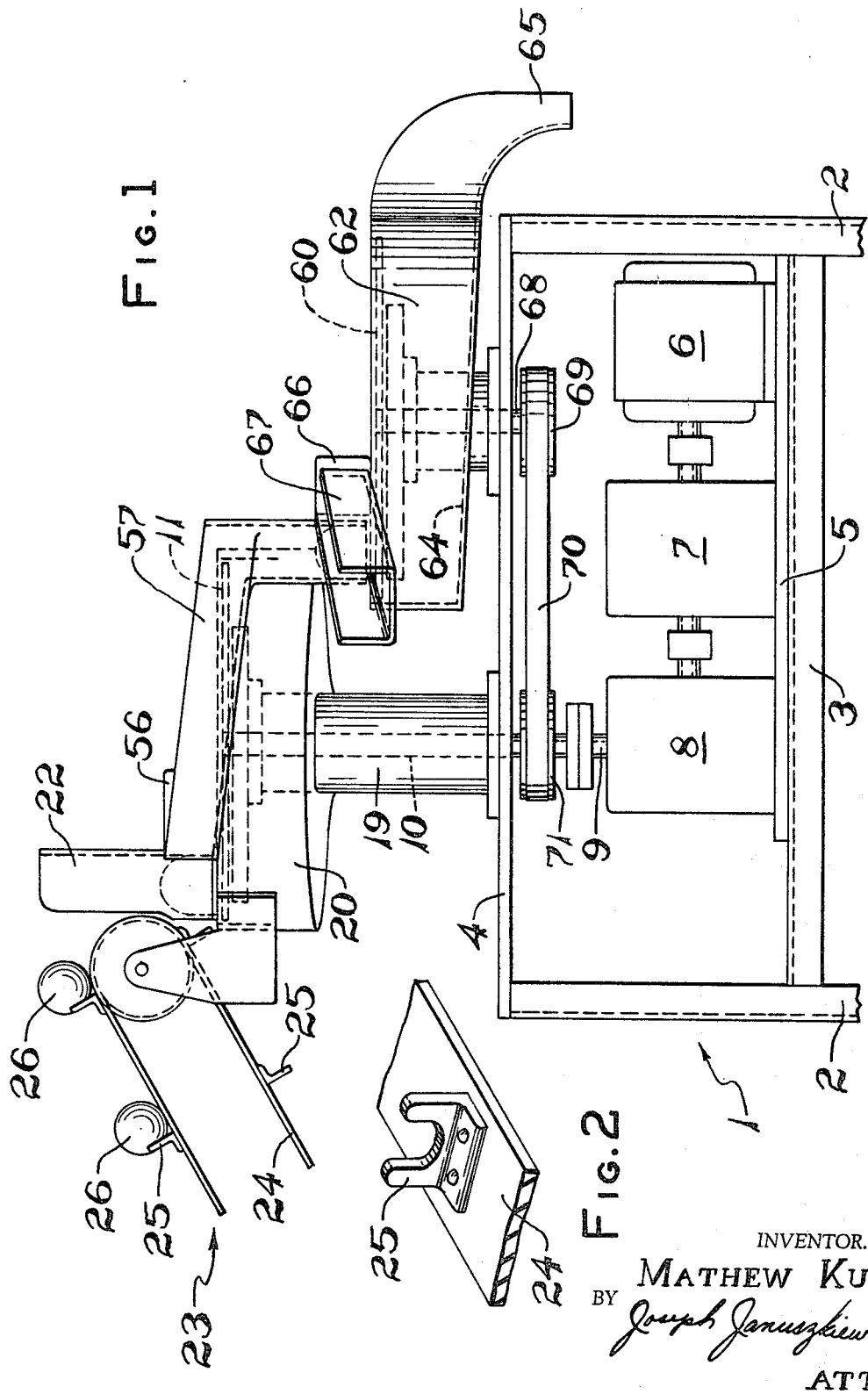
INVENTOR.
MATHEW KUTS
BY Joseph Januszkiewicz
ATTY.

April 30, 1968     M. KUTS     3,380,588
GOLF BALL SIZER
Filed Aug. 31, 1965     3 Sheets-Sheet 2
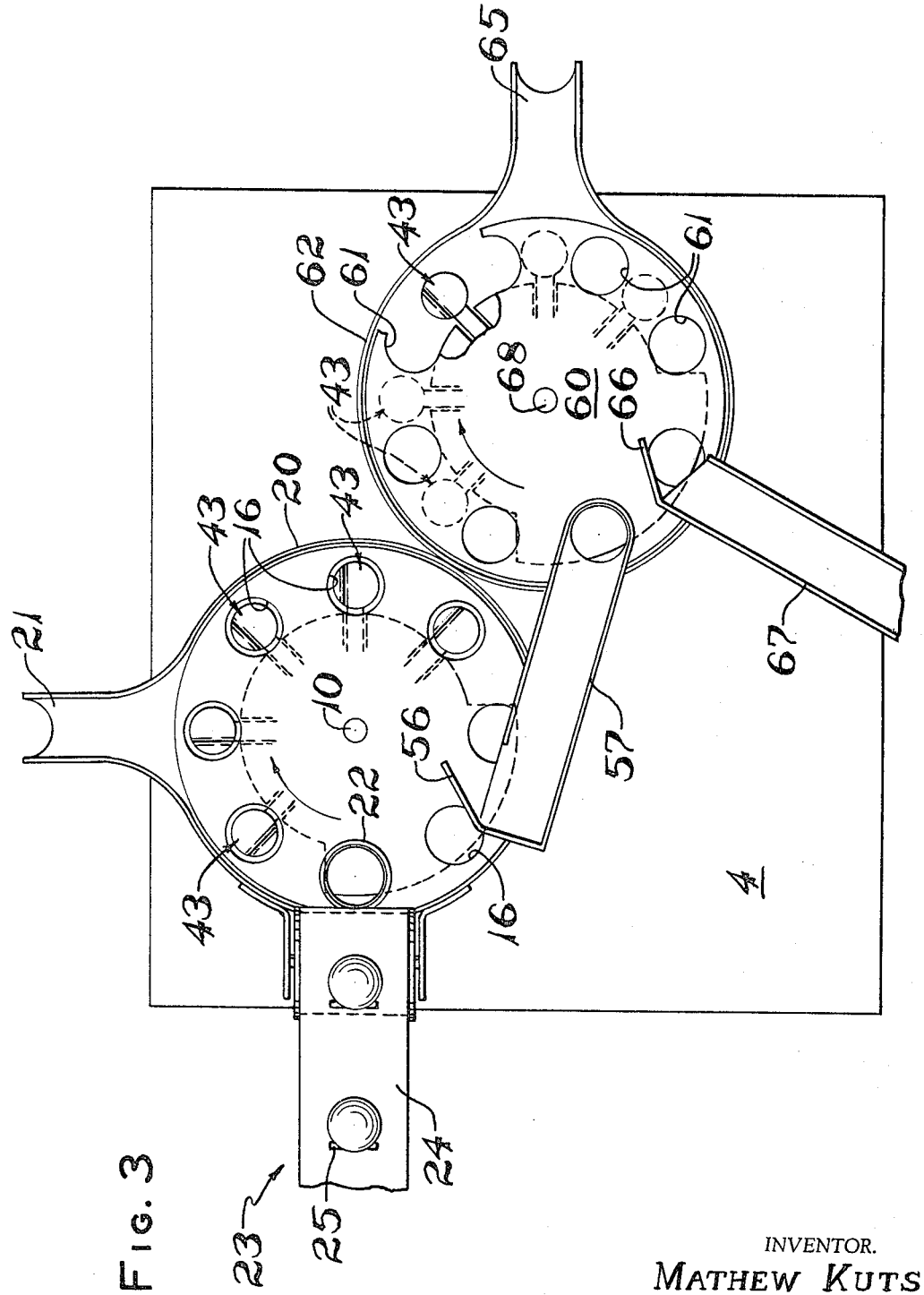
INVENTOR.
MATHEW KUTS
BY Joseph Januszkiewicz
ATTY.

April 30, 1968 M. KUTS 3,380,588
GOLF BALL SIZER
Filed Aug. 31, 1965 3 Sheets-Sheet 3
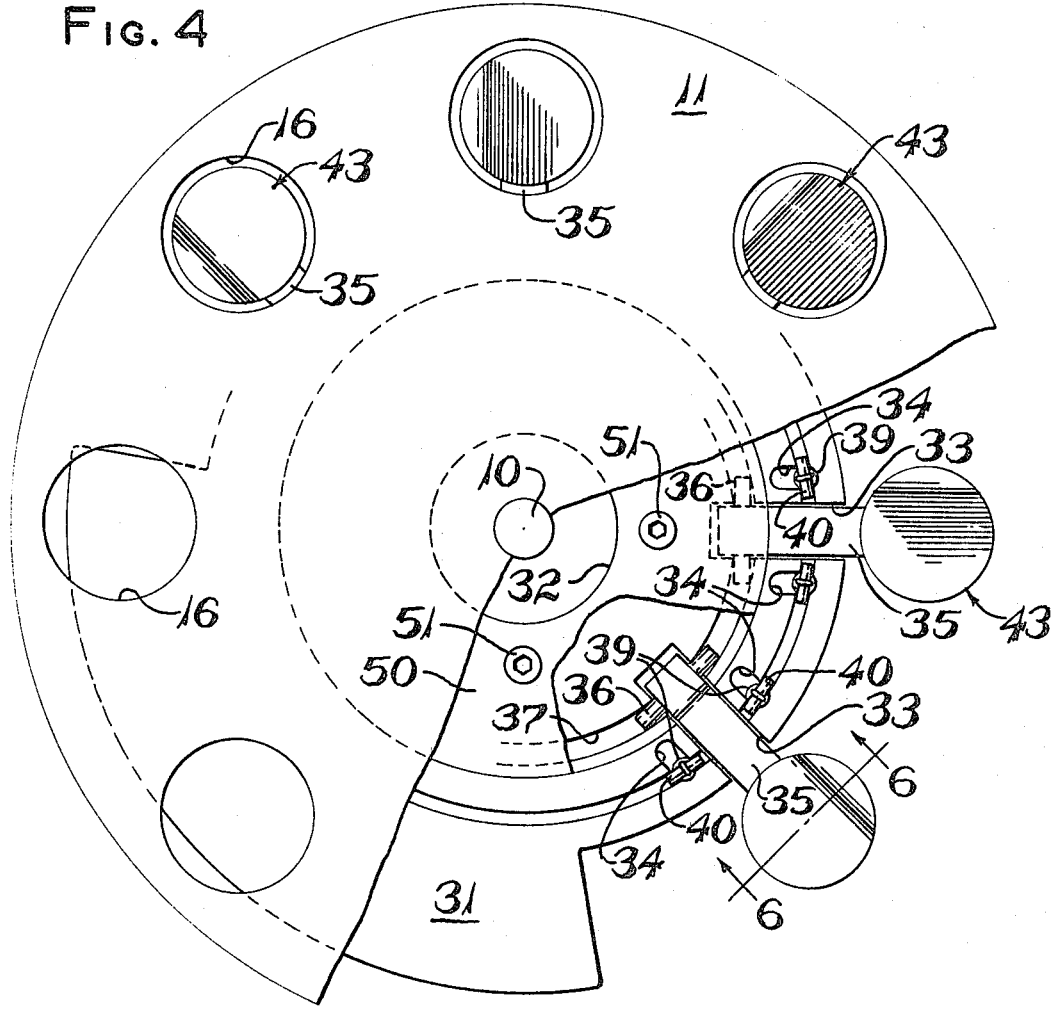
Fig. 4
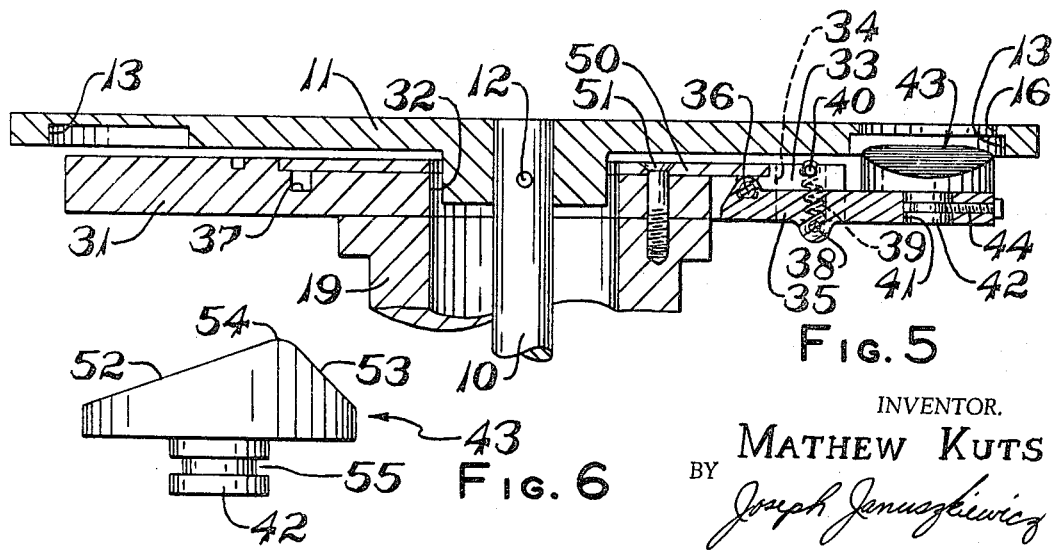
Fig. 5
Fig. 6
INVENTOR.
MATHEW KUTS
BY Joseph Januszkiewicz
ATTY.

United States Patent Office 3,380,588
Patented Apr. 30, 1968

3,380,588
GOLF BALL SIZER
Mathew Kuts, Akron, Ohio, assignor to The B. F. Goodrich Company, New York, N.Y., a corporation of New York
Filed Aug. 31, 1965, Ser. No. 484,080
7 Claims. (Cl. 209—87)

ABSTRACT OF THE DISCLOSURE

A testing apparatus having a pair of rotatable discs having a plurality of circumferentially spaced gauging holes cooperative with a plurality of circumferentially spaced adjustable cams which change the axes of the balls as the balls are rotated with the discs to present different diameters for gauging.

---

This invention relates to a tester and more particularly to a new and improved golf ball center testing machine.

The conventional golf ball includes a spherical core which may be either solid or filled with a fluid. The core is then encased in a solid rubber spherical casing after which such casing is wrapped with a rubber thread, presenting a golf ball center, and thereafter such center is encased in a tough outer layer of a rubber compound. In such manufacture of golf balls it is essential to uniformly wrap the rubber thread on the golf ball center under proper tension providing a finished spirally wound center that is truly spherical and uniform in its diameter throughout. It is necessary to avoid contour irregularities arising from concentrations of overlaps of the wound material as the resulting differences in diameters are difficult to detect under present testing standards.

The general purpose of this invention is to provide a novel apparatus for maintaining an effective quality control on the roundness of a golf ball center wherein the center is tested automatically for consistent diameters at a plurality of different axes.

The invention comprises a pair of discs with a plurality of circumferentially spaced gauging holes cooperative with a plurality of ball rotors which change the axes of the balls as they are gauged at the several holes.

An object of this invention is to provide a new and improved gauging apparatus which assures a golf ball center of uniform diameter.

A further object of this invention is to provide an improved gauging apparatus for improving the quality control of the product gauged.

Another object of this invention is to provide an efficient, accurate golf ball center tester.

A further object of this invention is to provide a novel means for testing various axes of a spherical object to assure roundness in the final accepted object within narrow acceptable limits.

With these and other objects in view, as will hereinafter more fully appear, and which will be more particularly pointed out in the appended claims, reference is now made to the following description taken in connection with the accompanying drawings in which:

FIG. 1 is a front elevational view of the golf ball center testing apparatus showing a portion of the golf ball center loader.

FIG. 2 is an isometric view of the U-shaped golf ball center transferring member.

FIG. 3 is a plan view of the golf ball center tester.

FIG. 4 is a plan view of a rotating disc with a portion broken away to show the cam and cam supports.

FIG. 5 is a cross sectional view of the rotating disc, the stationary plate, and cam support showing the cam in full.

FIG. 6 is a side elevational view of a cam.

Referring now to the drawings, wherein like reference characters designate like or corresponding parts throughout the several views, there is shown in FIG. 1 the base frame 1 having vertically extending supports 2 with lower laterally extending support members 3 which support a lower table 5 and an upper horizontally disposed table 4. Suitably mounted on the lower table 5 is a motor 6 which via transmission 7 and a right angle means 8 drives an output shaft 9. A shaft 10 shown in FIGS. 1 and 5 vertically aligned with shaft 9 is suitably connected thereto for rotation therewith. A disc 11 is keyed to shaft 10 as at 12 to provide continuous rotation therewith. Disc 11 has a circumferentially extending recess 13 on the underneath portion thereof for a purpose to be explained more fully hereinafter. Disc 11 has a plurality of circumferentially spaced bores 16 with vertically extending axes, which bores 16 act as gauging devices to permit specified diameters of golf ball centers to pass therethrough. Such bores 16 may be counterbored to receive gauges which are replaceable to permit the selection of sizes to be desired. A tubular support 19 is mounted on table 4 concentrically with shaft 10. Tubular support 19 has a cylindrical pan 20 mounted on the upper end thereof, the lower inner surface of which is adapted to receive golf ball centers that drop through the bores 16 of the disc 11. Such lower surface is slanted towards a chute 21 to provide a means of collecting the undersized golf ball centers which pass through the gauging operation to be described. A vertically extending inlet supply hopper 22 is located at one circumferential edge portion of the cylindrical pan 20 as shown in FIGS. 1 and 3. Supply hopper 22 has an opening on the lower edge portion to permit the golf ball centers which are to be gauged to come into contact with the movable disc 11 and more particularly the bores 16 which pick up such golf ball centers for rotation therewith. Golf ball centers are delivered to the supply hopper 22 via conveying means 23 which conveyor 23 consists of an endless belt 24 trailing over a pair of pulleys, only one being shown, with the belt 24 having a plurality of projecting U-shaped members 25 which carry a golf ball center 26 into the hopper 22.

The upper end portion of tubular member 19 has a cylindrical disc 31 (FIG. 4) suitably secured thereto. Cylindrical disc 31 has a central bore 32, a plurality of circumferentially spaced elongated recesses 33 and a plurality of circumferentially spaced elongated slots 34. Each recess 33 pivotally houses a cam holder 35, which cam holder 35 has a pivot pin 36 at one end portion. The outer end portions of pivot pins 36 are located in a groove 37 in cylindrical disc 31 as best seen in FIG. 4. Each cam holder 35 has a laterally extending pin 38 at its lower intermediate portion to which a spring 39 is connected. The upper end portion of vertically extending spring 39 is secured to a pin 40 which as shown in FIGS. 4 and 5 extends laterally across the elongated slot 34 in disc 31 to thereby bias cam holder 35 into an upwardly directed direction as viewed in FIG. 5. The outer end portion of cam holder 35 has a vertically extending slot 41 which receives the stem portion 42 of a cam 43. Cam holder 35 has a longitudinally extending threaded bore which receives a threaded set screw 44 which secures the cam 43 to the cam holder 35. In order to retain holder 35 in its position on the cylindrical disc 31, a cylindrical plate 50 is secured to the cylindrical disc 31 and the tubular member 19 by a plurality of screws 51. Cam 43 has a pair of opposed inclined surfaces 52 and 53 with an upper apex 54 and a slot 55 which receives the end portion of set screw 44 whereby the cam 43 is locked in position on cam holder 35. Such cam 43 may be adjusted in its position in slot 41 to impart the desired rotation to the golf ball center 26. Cylindrical pan 20 has a deflector plate 56 located along the outer circumference of such pan to deflect golf ball centers into an incline chute 57 which delivers the golf ball centers onto a second circular disc 60 which is similar in all respects to the previously described cylindrical disc 11 except that the bores 61 (on disc 60) are of a different size. Such rotatable cylindrical disc 60 is mounted within a pan 62 which is similar to the pan 20 which was previously described. Such pan 62 has a lower inclined surface 64 which delivers the gauged golf ball centers that pass through the bores 61 for delivery to a chute 65. In a similar manner, pan 62 has a deflector plate 66 which deflects oversized golf ball centers into a chute 67. Circular disc 60 is rotated by a shaft 68 that is keyed to a pulley 69 which is driven by a timing belt 70 trained about driven pulley 71. Pulley 71 is keyed to shaft 10 which is driven by shaft 9 in a manner previously described.

*Operation*

Golf ball centers from a suitable supply source are delivered via conveying means 23 and U-shaped members 25 to the supply tube 22 which intermittently delivers golf ball centers to the circular disc 11. As the disc 11 rotates in a clockwise direction as viewed in FIGS. 3 and 4, the gauging station or bores 16 come underneath the supply tube 22 and pick up a golf ball center for rotation therewith. If the golf ball center 26 is of such a diameter, which is considered to be undersized, such center 26 will pass through the bores 16 and fall to the lower inclined surface of pan 20 for deflection to the chute 21 which is the first discharge chute. As such disc 11 rotates with the golf ball center 26 retained within the bore 16, it passes over the stationary cam 43 which rotates the golf ball center as such golf ball center comes into contact with the incline surface of such cam 43. The rotation of the golf ball center changes the axis or the diameter which is gauged after such golf ball center re-seats itself on the bore 16 as such disc 11 continues to rotate clockwise and is now in a position circumferentially spaced between two cams 43. It will be noted that the disc 11 permits the golf ball center 26 to pass therethrough when such bores 16 are located between the respective cams 43 in its clockwise rotation about the axis of shaft 10.

The underside recess 13 on disc 31 permits the locating of the cams 43 closely adjacent to the bores 16 to facilitate the rotating of the ball centers. With cam holder 35 being spring biased into its upwardly disposed position, any force greater than anticipated by ball center 26 on cam 43 will move cam holder 35 and cam 43 downwardly against the action of spring 39.

The golf ball core continues to be rotated intermittently by the respective cams 43 during the clockwise movement of disc 11 until such golf ball center is deflected by deflector 55 into chute 57 for delivery onto rotating disc 60. The sequence of operation on disc 60 is similar to that on disc 11 wherein the golf ball center is gauged at the respective gauging stations through the operation of intermittent rotation of the respective golf ball centers over cams 43 and upon re-gauging by the bores 61. Upon a proper size of diameter being found, the bore 61 will permit the golf ball center to fall therethrough into the lower portion of the pan for delivery to a discharge means 65 which directs the golf ball centers of proper size to a collection station. Those golf ball centers which are oversize continue to rotate with the circular disc 60 until deflected by deflector 66 into a discharge chute 67 to a supply bin of oversize golf centers.

It should be understood, of course, that the foregoing disclosure relates to only a preferred embodiment of the invention and that numerous modifications or alterations may be made therein without departing from the spirit and the scope of the invention as set forth in the appended claims.

I claim:

1. A golf ball testing machine comprising a first support member, said support member having a plurality of spaced gauging means for gauging the diameter of a golf ball center, a second member mounted in cooperative relationship relative to said first support member, power operated means operatively connected to one of said members for moving said one member relative to the other of said members to provide relative movement therebetween, cam means on said second member in alignment with said gauging means for rotating a golf ball center in said gauging means, and said cam means having an upper end portion located at all times below said gauging means with said cam means being operative to rotate a golf ball center to orientate a different axis of the golf ball center for gauging the diameter thereof.

2. A spherical ball tester comprising at least a pair of members, each member having a plurality of spaced gauging stations, cam means in alignment with said gauging stations to rotate a ball held by each gauging station upon relative movement therebetween, means operatively connected to said cam means to limit the upward movement of said cam means toward said gauging station, supply means for delivering such balls to one of said members, means interconnecting said members for delivering such balls from one of said members to the other of said members, a discharge means cooperative with the other of said members for discharging oversized balls therefrom, and motive means operatively connected to said members for rotating said members about their axes and relative to said cam means whereby such balls are rotated to present different axes for gauging such diameters for passage through such gauging stations.

3. A golf ball center tester comprising support means, a cylindrical plate member rotatably mounted on said support, means for rotating said plate member relative to said support means, said member having a plurality of circumferentially spaced bores for gauging the diameters of golf ball centers, gauge means mounted in each of said bores to define a gauging diameter size, said support means having means for collecting ball centers passing through said bores for delivery to a discharge chute, friction engageable means mounted on said support means in the circumferential path of movement of said bores, said friction engageable means having an uppermost surface located below said plate member and said bores operative to contact a ball center for rotating a ball center held in said bore, said friction engageable means has its uppermost surface lying along a plane that intersects a radial line extending from the axis of rotation of said plate member at only a point in said plane, a feed hopper mounted on said support means for delivery of a golf ball center to said plate member in alignment with the path of movement of said bores for registering therewith, and discharge means mounted on said support means for discharging oversized golf ball centers from said bores of said plate member.

4. A golf ball center tester comprising support means having a pan shaped housing mounted thereon, a cylindrical plate member rotatably mounted in said housing, means for continuously rotating said plate member relative to said housing, said plate member having a plurality of circumferentially spaced gauging bores, a feed hopper mounted on said support means for registering a ball center into one of said bores as said plate member rotates, a chute connected to said housing for discharging undersized golf ball centers passing through said bores, deflector means mounted along the path of movement of said bores for deflecting oversized golf ball centers into a discharge chute, spring biased cam means mounted in said housing in circumferential alignment with said bores for rotating a ball center, said cam means having a pair of inclined surfaces terminating into an apex, stop means limiting the upward movement of said cam means to maintain said apex below said bores at all times, and means for adjusting said cam means to varying the angular relationship between a line passing through said apex and a radial line passing through the center of rotation of said rotatable disc.

5. A golf ball center tester comprising a pair of supports, a cylindrical member mounted for rotation in each support, means operatively connected to said members for rotation, each of said members having a plurality of circumferentially spaced bores, gauge means mounted in each of said bores to define a gauging diameter size, discharge means, each of said supports having means for collecting ball centers passing through their said bores for delivery to said chutes, each member having a plate mounted thereon below said cylindrical member, each plate having a plurality of radially extending recesses, a spring biased cam holder pivotally mounted in each of said recesses, a cam adjustably mounted in each of said cam holders, said cams lying in the path of movement of said bores to frictionally engage a golf ball center located in said bores during rotation of said members, each cam having a pair of inclined surfaces terminating in an apex, a hopper mounted on one of said supports for delivering golf ball cores to one of said bores registering therewith, means interconnecting said cylindrical members for transferring ball centers from said one support to the other of said supports and discharge means mounted on said other support for discharging oversized ball centers from said bores of said other support to a discharge bin.

6. A gauging machine comprising a support frame, a vertically extending driven shaft mounted on said frame for rotation thereon, a disc secured to said shaft for rotation therewith about a vertical axis of rotation, said disc having a plurality of bores operative to gauge and selectively pass a gauged article therethrough, each bore having an axis parallel to said vertical axis, said disc being in a horizontal plane, material supply means for directing objects to be tested onto said disc for gauging by said bores, means for discharging articles from said disc after being gauged thereon, and cam means mounted below said disc in alignment with the path of movement of said bores and having a planar upwardly extending surface that is skew relative to said horizontally extending plane of said disc and to an outwardly extending radial line extending from said vertical axis of rotation.

7. A golf ball tester comprising a cylindrical support member, said support member having a plurality of circumferentially spaced gauging bores for gauging the diameter of a golf ball center, a cylindrical pan member mounted in cooperative encompassing relationship relative to said support member, power operated means operatively connected to one of said members for rotating said one member relative to the other of said members providing relative rotation therebetween, supply inlet means operatively connected to said support member for delivering golf ball centers thereto for testing, discharge means operatively connected to said pan member for discharging golf ball centers received by said pan member and passed through said bores, a discharge chute operatively connected to said support member for discharging golf ball centers not passing through said bores, inclined surface cam means on said pan member in alignment with said bores and cooperative therewith for rotating golf ball centers to present different diameters for gauging in said bores, said cam means having its uppermost portion located below said support member and said gauging bores at all times, and wherein the extension of said inclined surface cam means intersects said support member along a line that intersects a radial line extending from said vertical axis of rotation at a point.

References Cited

UNITED STATES PATENTS 2,356,945  8/1944  Pesznecker _____ 209—87

FOREIGN PATENTS 453,827  12/1949  Italy.

M. HENSON WOOD, JR., *Primary Examiner.*

R. A. SCHACHER, *Assistant Examiner.*